US012568363B2

(12) United States Patent
Loch

(10) Patent No.: US 12,568,363 B2
(45) Date of Patent: Mar. 3, 2026

(54) SECURE VEHICLE COMMUNICATION SYSTEM

(71) Applicant: Transportation IP Holdings, LLC, Norwalk, CT (US)

(72) Inventor: Mark Elliott Loch, Fairview, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 698 days.

(21) Appl. No.: 17/480,192

(22) Filed: Sep. 21, 2021

(65) Prior Publication Data

US 2022/0007186 A1 Jan. 6, 2022

Related U.S. Application Data

(63) Continuation-in-part of application No. 16/178,896, filed on Nov. 2, 2018, now abandoned.

(51) Int. Cl.
*H04W 12/06* (2021.01)
*H04W 4/42* (2018.01)
*H04W 76/10* (2018.01)

(52) U.S. Cl.
CPC ............. *H04W 12/06* (2013.01); *H04W 4/42* (2018.02); *H04W 76/10* (2018.02)

(58) Field of Classification Search
None
See application file for complete search history.

(56) References Cited

U.S. PATENT DOCUMENTS

| | | | |
|---|---|---|---|
| 6,072,468 A | 6/2000 | Hocker et al. | |
| 7,418,596 B1 | 8/2008 | Carroll et al. | |
| 7,760,077 B2 | 7/2010 | Day | |
| 8,702,043 B2 | 4/2014 | Daum et al. | |
| 8,825,239 B2 | 9/2014 | Cooper et al. | |
| 8,914,171 B2 | 12/2014 | Noffsinger et al. | |
| 9,100,838 B2 | 8/2015 | Lundquist et al. | |
| 9,481,384 B2 | 11/2016 | Noffsinger et al. | |
| 9,802,631 B2 | 10/2017 | Matthews et al. | |
| 9,834,237 B2 | 12/2017 | Plotnikov et al. | |
| 10,167,005 B2 | 1/2019 | Noffsinger et al. | |
| 10,501,100 B2 | 12/2019 | Plotnikov et al. | |
| 10,689,016 B2 | 6/2020 | Woo et al. | |
| 2004/0196977 A1* | 10/2004 | Johnson | .............. H04L 63/0428 |
| | | | 380/270 |

(Continued)

*Primary Examiner* — Thomas E Worden
(74) *Attorney, Agent, or Firm* — K&L Gates LLP

(57) ABSTRACT

A communication system includes a first communication device located onboard a first vehicle in a vehicle system formed from the first vehicle and at least a second vehicle, a second communication device located onboard the second vehicle in the vehicle system, and a first communication path extending between the first and second communication devices and established using a first communication medium. The first and second communication devices may share a security credential via the first communication path. The first and second communication devices also may establish a secure second communication path between the first and second communication devices using the security credential that is shared via the first communication path. The second communication path established by the first and second communication devices uses a different, second communication medium extending between the first and second communication devices.

14 Claims, 4 Drawing Sheets

(56)  References Cited

U.S. PATENT DOCUMENTS

| | | | |
|---|---|---|---|
| 2006/0072761 A1 | 4/2006 | Johnson et al. | |
| 2011/0284700 A1 | 11/2011 | Brand et al. | |
| 2012/0078453 A1 | 3/2012 | Daum et al. | |
| 2014/0129061 A1 | 5/2014 | Cooper et al. | |
| 2015/0217790 A1* | 8/2015 | Golden ................. | B60T 17/228 |
| | | | 701/19 |
| 2016/0105539 A1* | 4/2016 | Maddox .................. | H04W 4/48 |
| | | | 455/557 |
| 2016/0344747 A1 | 11/2016 | Link, II | |
| 2018/0144128 A1 | 5/2018 | Hakuta et al. | |
| 2019/0149342 A1* | 5/2019 | Fynaardt .............. | H04L 9/0891 |
| | | | 713/156 |
| 2019/0190926 A1 | 6/2019 | Choi et al. | |
| 2019/0217831 A1 | 7/2019 | Viele | |

* cited by examiner

400

SECURE VEHICLE COMMUNICATION SYSTEM

CROSS-REFERENCE TO RELATED APPLICATIONS

This application is a continuation-in-part of U.S. patent application Ser. No. 16/178,896 (filed 3 Nov. 2018), the entire disclosure of which is incorporated herein by reference.

BACKGROUND

Technical Field

The subject matter described herein relates to locomotive communication systems that provide for secure communication between communication devices.

State of the Art

Vehicles such as locomotives may communicate with off-board devices using wireless communication technologies. For example, locomotives in the same rail vehicle consist can communicate with each other using cellular devices, WiFi devices, radio frequency (RF) radios, or the like. These locomotives may communicate with each other via wired connections, such as over a multiple unit (MU) line, brake line, or the like. The wired connections are secure in that a device typically can communicate via the wired connection only when the device is physically connected with the wired connection. The operator(s) of the locomotives can ensure that only certain approved devices are coupled with and able to communicate over the wired connection.

But these wired communication technologies on locomotives tend to have slower communication speeds and bandwidths when compared with the wireless communication technologies used to communicate with off-board devices. The wireless communication technologies, however, have shown to be more susceptible to attack or message interception by devices that are not approved for communication with the locomotives. As a result, the locomotives are left with a choice between slow but secure wired communications, or fast but insecure wireless communications.

BRIEF DESCRIPTION

In one example, a communication system includes a first communication device located onboard a first vehicle in a vehicle system formed from the first vehicle and at least a second vehicle, a second communication device located onboard the second vehicle in the vehicle system, and a first communication path extending between the first and second communication devices and established using a first communication medium. The first and second communication devices may share a security credential via the first communication path. The first and second communication devices also may establish a secure second communication path between the first and second communication devices using the security credential that is shared via the first communication path. The second communication path established by the first and second communication devices uses a different, second communication medium extending between the first and second communication devices.

In one example, a method includes communicating a security credential between communication devices onboard different vehicles in a vehicle system. The security credential is communicated between the communication devices via a first communication path established using a first communication medium extending between the communication devices. The vehicle system is formed from at least the vehicles having the communication devices that share the security credential. The method also includes establishing a secure second communication path between the communication devices onboard the different vehicles using the security credential that is shared via the first communication path, the second communication path established using a different, second communication medium extending between the communication devices and securely communicating a data signal between the communication devices via the secure second communication path to control operation of the vehicle system.

In one example, a vehicle communication system is provided that includes a first communication device located onboard a first vehicle in a vehicle system formed from the first vehicle and at least a second vehicle in the vehicle system. The communication system also includes a second communication device located onboard the second vehicle in the vehicle system. The first and second communication devices are communicatively coupled with each other via a wired pathway extending between the first and second communication devices. The first communication device may receive a security credential from an off-board device via the wired pathway and share the security credential with the second communication device via the wired pathway. The first and second communication devices also may establish a wireless network between the first and second communication devices using the security credential that is shared via the wired pathway.

In one example, a vehicle communication method is provided. The method includes receiving a security credential at a first communication device from an off-board device. The first communication device may be located onboard a first vehicle in a vehicle system formed from the first vehicle and at least a second vehicle in the vehicle system. The security credential may be received via a wired pathway extending between the first and second communication devices. The method also includes communicating the security credential from the first communication device to the second communication device via the wired pathway, and establishing a wireless network between the first and second communication devices using the security credential that is shared via the wired pathway.

In one example, a communication system is provided and includes a first communication device disposed onboard a vehicle system. The first communication device may receive a security credential from an off-board device via a first wired pathway. The communication system also includes a second communication device disposed onboard the vehicle system. The first communication device may communicate the security credential to the second communication device via the first wired pathway or a second wired pathway. The first communication device or the second communication device may establish a wireless network between the first communication device and the second communication device using the security credential. The first communication device may be onboard a first vehicle of the vehicle system and the second communication device may be disposed onboard a second vehicle of the vehicle system. The first communication device and the second communication device may continue communicating with each other via the wireless network subsequent to the first vehicle separating from the second vehicle.

BRIEF DESCRIPTION OF THE DRAWINGS

The inventive subject matter may be understood from reading the following description of non-limiting examples, with reference to the attached drawings, wherein below.

DETAILED DESCRIPTION

One or more examples of the inventive subject matter described herein include communication systems that provide for secure, higher speed communications between vehicles, such as between vehicles that are connected with each other in the same rail vehicle system. While the description herein focuses on rail vehicles (such as locomotives) and rail vehicle systems (e.g., formed from two or more rail vehicles), not all embodiments of the inventive subject matter are limited to rail vehicles or rail vehicle systems. One or more embodiments may be applied to communications between other types of vehicles, such as mining vehicles, other off-highway vehicles (e.g., vehicles that are not designed for travel on public roadways and/or that are not legally permitted for travel on public roadways), automobiles, marine vessels, or the like.

Figure 1:
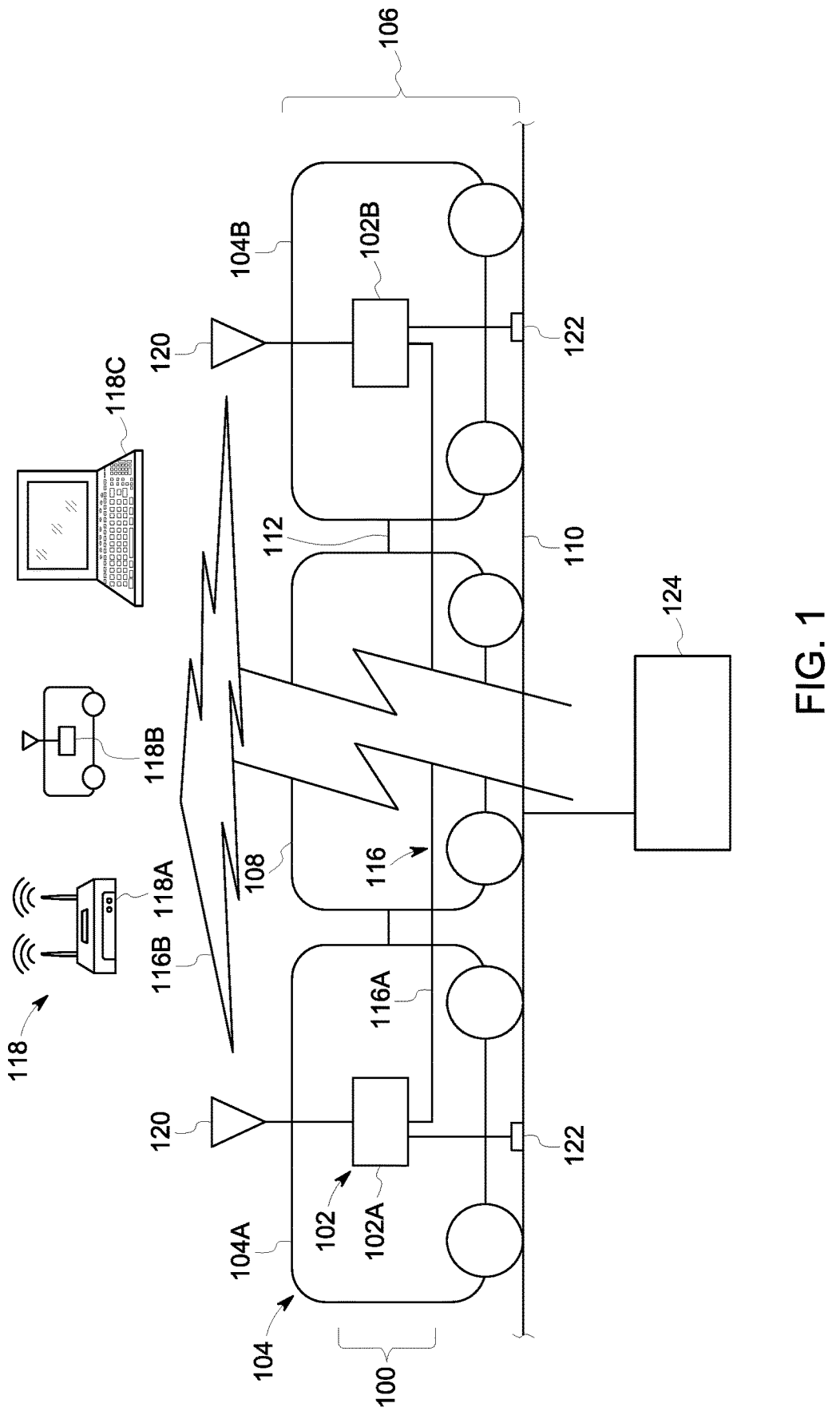
FIG. 1 illustrates one example of a secure communication system.

FIG. 1 illustrates one example of a secure communication system 100. The communication system includes communication devices 102 (e.g., devices 102A, 102B) disposed onboard different vehicles 104 (e.g., vehicles 104A, 104B) in a vehicle system 106. The vehicles may be mechanically coupled with each other in the vehicle system directly or indirectly (e.g., by at least one additional vehicle between the coupled vehicles). In one example, the vehicle system is a rail vehicle system and the vehicles are rail vehicles traveling on a route 110 that includes a track. For example, the vehicles 104 can be propulsion-generating rail vehicles (e.g., locomotives) while the vehicle(s) 108 can be one or more propulsion-generating vehicles, one or more non-propulsion-generating vehicles (e.g., rail cars, ore cars, passenger cars, etc.), or a combination of one or more propulsion-generating vehicles and one or more non-propulsion-generating vehicles. The propulsion-generating vehicles can be engine-based vehicles, electric vehicles (e.g., electric automobiles, battery electric locomotives, etc.), or hybrid vehicles. The vehicles are mechanically connected with each other by couplers 112. Alternatively, the vehicles may not be mechanically coupled with each other but may be logically coupled with each other without mechanical couplings. For example, the vehicles may be mechanically separate from each other but may communicate with each other to coordinate individual movements of the vehicles with each other so that the separate vehicles travel together along the route.

The communication devices represent hardware circuitry that includes and/or is connected with one or more processors (e.g., one or more microprocessors, one or more field programmable gate arrays, one or more integrated circuits, and/or the like) that perform the operations described herein in connection with the communication devices. The communication devices can include or represent transceiving circuitry such as modems, routers, antennas 120, switches, and the like. The communication devices can run one or more software applications that direct the operations of the processors and/or transceiving circuitry. The communication devices send and/or receive data signals or messages between the communication devices. One or more other pieces of equipment onboard the vehicles can communicate data with each other via the communication devices, as described herein. In one example, the communication devices are disposed onboard different vehicles in a multi-vehicle system. Alternatively, the communication devices may be disposed onboard the same vehicle in a single or multi-vehicle system.

The communication devices are communicatively coupled with each other by a first communication path 116 (labeled communication path 116A in FIG. 1). The first communication path can be a wired connection formed of one or more cables, wires, conductive buses, or the like, that form one or more conductive pathways that extend at least between the communication devices. As shown, the first communication path may extend through and interconnect multiple vehicles in the vehicle system. Examples of such wired connections can include MU cables, brake lines, Ethernet cables, powerlines, or the like. The wired connection provides a first communication medium through or over which the communication devices can send signals to and/or receive from each other. One or more additional communication devices and/or other equipment also may be connected with the first communication path for communication via the wired connection. For example, other equipment (described herein) can be directly connected with the first communication path for communicating messages with other equipment and/or the communication devices. Optionally, other equipment can be indirectly connected with the first communication path for communication with other equipment via the communication device(s). For example, equipment onboard one vehicle can provide signals to the communication device, which can then send the signals via the first communication path to another communication device. The communication device that receives the signals can then send the signals to the equipment to which the signals are addressed. Alternatively, the communication device can directly send the signals via the first communication path to the equipment without being first sent to another communication device.

In operation, the communication devices share a security credential via the first communication path. The security credential can be shared by at least one of the communication devices communicating the security credential to at least one other communication device. One or more of the communication devices may be incorporated or otherwise coupled with other equipment onboard the vehicle(s). The security credential can be received by a communication device and shared with other communication devices via the same communication pathway, or via different communication pathways. As one example, a first communication device can receive the security credential via a first cable or wire and can communicate the same security credential with at least a second communication device via the first cable or wire, and/or via one or more other cables or wires.

The security credential can be some information or data indicating that the communication device sending or possessing the security credential is a secure, authorized, and/or previously selected device for communicating with another device. For example, prior to sharing a security credential, the communication device 102A may not communicate with the communication device 102B, such as by the communication device 102B not having the encryption key used by the communication device 102A to encrypt signals sent by the communication device 102A, by not receiving or ignoring signals received from the communication device 102B, by not sending signals to the communication device 102B, by not providing a network identifier (e.g., network address) to the communication device 102B, by not providing authentication information (e.g., a login and password combination), or the like.

As described herein, the security credential can be shared between the communication devices via the first communication path of a first type of communication medium (e.g., conductive pathways) and then used by the communication devices to establish, create, and/or otherwise begin communicating over a second communication path 116B between the communication devices. This second communication path can be embodied in a different type of medium than the first communication path. For example, the first communication path can be a wired communication path (e.g., formed of one or more conductive bodies) while the second communication path is a wireless communication path (e.g., formed of transient electromagnetic waves). Alternatively, the first communication path may be a wireless communication path and the second communication path can be a wired communication path. In another example, both the first and second communication paths are wired communication paths. Or both the first and second communication paths can be wireless communication paths.

The first communication path can be a pre-existing conductive pathway (e.g., a pre-existing cable extending along the length of the vehicle system) that also is used to communicate one or more data signals between the vehicles in the vehicle system. For example, the first communication path A can be a power line (e.g., a 74 Vdc line) or an electronically controllable pneumatic brake line (e.g., a 230 Vdc line) and the communication devices can use Ethernet over power line communication to communicate using the first communication path. As another example, the first communication path can be an MU line of a train and the communication devices can use Ethernet over MU line communication to communicate using the first communication path.

The first communication path can be a slower communication path than the second communication path and/or introduce increased amounts of electromagnetic noise into signals communicated via the first communication path than signals communicated via the second communication path. For example, even though some of these types of communication paths may use Ethernet technology to communicate, this type of communication of these types of communication paths can be slower, have reduced bandwidth, have increased electromagnetic noise, and/or be less reliable than wireless communications. For example, cellular modems, WiFi modems and routers, RF radios, and the like, can wirelessly communicate via the second communication path (e.g., a 220 MHz radio communication path, a wireless Ethernet network, etc.) at faster speeds (e.g., more bits, kilobits, or bytes per second), increased bandwidths (e.g., larger ranges of frequencies can be used for the carrier signals used for communication), with reduced electromagnetic noise, and/or with greater reliability. Optionally, the first communication path may be a trainline or other conductive pathway having slower data transmission speeds than the second communication path.

The communication devices can share a security credential by at least one of the communication devices communicating the security credential to the other communication device via the first communication path. The security credential can be communicated via the first communication path because the first communication path is more secure than the second communication path in at least one example of the subject matter described herein. For example, the first communication path may not be accessible by any other communication devices 118 (e.g., communication devices 118A-C in FIG. 1) that are not onboard the vehicle system. These other communication devices can include a wireless router 118A, a communication device 118B (e.g., another communication device 102) onboard another vehicle that is not in the vehicle system, a computer 118C having wireless communication capabilities, and the like. Because none of these communication devices is connected with the first communication path (e.g., by a connector or hard-wired connection), these other communication devices cannot communicate with the communication devices and/or other equipment onboard the vehicle system via the first communication path.

The communication device 102A can send a signal containing a security credential to the communication device 102B via the first communication path. Because the other communication devices are not connected with the first communication path, the other communication devices cannot receive the security credential from the communication device 102A via the first communication path. The security credential can include information that is used by the communication devices 106A, 106B having the security credential to establish or join the second communication path. For example, the security credential can include an encryption key used by the communication devices to encrypt and decrypt wirelessly communicated messages sent via the second communication path. As another example, the security credential can include a login and/or password that is required to access a wireless communication network that includes or is represented by the second communication path. As another example, the security credential can include a network address of another communication device. For example, the communication device can provide the network address of the communication device to the communication device as a security credential and the communication device can provide the network address of the communication device to the communication device as a security credential.

In one example, the security credential is communicated via the first communication path without encrypting the security credential. Because the first communication path is inaccessible to devices that are off-board the vehicle system, the security credential can be communicated using the first communication path without encrypting the security credential. This may be due to the inaccessibility of the first communication path. Alternatively, the security credential can be communicated using an encrypted signal send via the first communication path.

The communication devices use the shared security credential(s) to establish the second communication path. The second communication path can be established by the communication devices beginning to wirelessly communicate with each other using or based on the security credential. For example, the communication devices may begin communicating encrypted messages with each other via the second communication path using the shared encryption key. As another example, the communication devices may use the login and password to access the wireless network that includes or is formed by the second communication path. As another example, the communication devices can send messages to the network addresses of each other using the second communication path. Because other devices 118 that did not receive or otherwise share the security credential do not have the security credential, these devices 118 are unable to communicate with the communication devices using the second communication path.

The communication devices can establish and/or use the second communication path without sharing network identifying information over or through the second communication path and/or without broadcasting any network identifying information. The communication devices may not wirelessly broadcast a network identifier of any of the communication devices in one example. For example, the communication devices may not wirelessly broadcast a network address of any communication devices connected to the wireless network that is represented by the second communication path. The communication devices may not wirelessly broadcast a network access identifier, name, or other identity of any communication devices connected to the wireless network that is represented by the second communication path. Additionally, or alternatively, the communication devices may not wirelessly broadcast a network identifier of the wireless network that is represented by the second communication path. For example, the communication devices may not wirelessly broadcast a network address of any device connected to the wireless network that is represented by the second communication path. The communication devices may not wirelessly broadcast a network access identifier, name, or other identity of any device connected to the wireless network that is represented by the second communication path. Withholding and not sharing the network identifier information associated with the second communication path can provide for increased security for the second communication path as other devices 118 may not be able to identify or find the second communication path without this information.

In one example, the first communication path is not a pre-existing cable extending through the vehicle system but is a conductive portion of the route. For example, the route can be a track formed from one or more conductive rails, the route can include a catenary, or the route can include another conductive portion. The communication devices can include conductive bodies 122 (e.g., conductive shoes, brushes, connectors, or the like) that engage at least one of the conductive portion of the route to inject signals into the portion of the route and to receive signals conducted through the portion of the route. The signals can be conducted through the portion of the route from the conductive body of one communication device to the conductive body of another communication device to permit these communication devices to share the security credential.

Optionally, the security credential can be obtained from an off-board device 124. The off-board device 124 that can provide the security credential may be referred to as a secure off-board device while the off-board devices 118 that do not provide or do not share the security credential can be referred to as unsecure off-board devices. The secure off-board device can represent one or more wayside devices disposed alongside or near the route. The secure off-board device can be part of a positive train control system, a signal, a gate, or the like, that is conductively coupled with the conductive portion of the route, which is conductively coupled with the first communication pathway by one or more wires or cables and associated connectors, or the like. The secure off-board device can include one or more communication devices that can inject a signal containing a security credential into the conductive portion(s) of the route or otherwise communicate the security credential into the first communication pathway. This signal can be received by the communication devices via the conductive bodies and the security credential can then be used to establish and begin communicating via the second communication path.

Optionally, the secure off-board device can represent a mobile and/or handheld device that can be coupled with the first communication pathway (e.g., using one or more connectors, such as by plugging the off-board device into a circuit that includes or is connected with the first communication pathway). The off-board device can then communicate the security credential to the communication device (s).

In one example, the secure off-board device can communicate the security credential to the onboard communication device(s) while the vehicle system is moving, and the secure off-board device is stationary. The security credential can be communicated via the conductive portion of the route to the first communication pathway via the conductive bodies while the vehicle system is moving. Optionally, the secure off-board device can communicate the security credential to the onboard communication device(s) while both the vehicle system and the secure off-board device are moving. For example, the secure off-board device can be disposed onboard another vehicle system and may communicate the security credential via the conductive portion of the route that both vehicle systems are traveling along.

One or more of the communication devices can update the security credential that is used for communicating via the second communication path. For example, the communication device 102A may send an updated, new, and/or different security credential to the communication device 102B on a periodic basis, an aperiodic basis, or at random times. Upon sharing of this updated, new, and/or different security credential, the communication devices can re-establish communicating over the second communication path using the updated, new, and/or different security credential. Changing the security credential can further increase the security of communications sent using the second communication path as any off-board device 118 attempting to communicate over or intercept communications sent over the second communication path would need to repeatedly be able to decipher the changing security credentials. Alternatively, the security credential is not updated, replaced, or changed. For example, the same security credential can be used for an entire trip of the vehicle system from a starting location where the vehicles are coupled with each other to another location where the vehicles are separated from each other.

In one example, different security credentials can be used for different geographic areas. Prior to entering a geographic area, the communication devices onboard a vehicle system can obtain a security credential for that area (e.g., from the secure off-board device located outside of or just inside the geographic area). The communication devices can then switch to using the security credential to establish or maintain the second communication pathway during travel within the geographic area. As another example, one or more of the communication devices onboard the vehicle system may obtain or download several security credentials from the secure off-board device. These security credentials may be associated with or needed to establish the secure second communication pathway in different respective geographic areas (e.g., each credential may be used with a different area). The onboard communication devices may switch which security credential is used to establish or maintain the secure second communication pathway as the vehicle system moves between or among the different areas.

The sharing of the security credential and/or the formation of the second communication path can occur automatically. For example, responsive to a communication device being connected to the first communication path, the communication device can communicate a request signal to other communication devices that also are connected to the first communication path. This request signal can be received by the other communication device(s) and the other communication device(s) can respond with a signal that includes the security credential. Because only approved communication devices that are onboard the vehicle system can connect to the first communication path, the security credential can be shared with communication devices as the communication devices connect with the first communication path.

Figure 2:
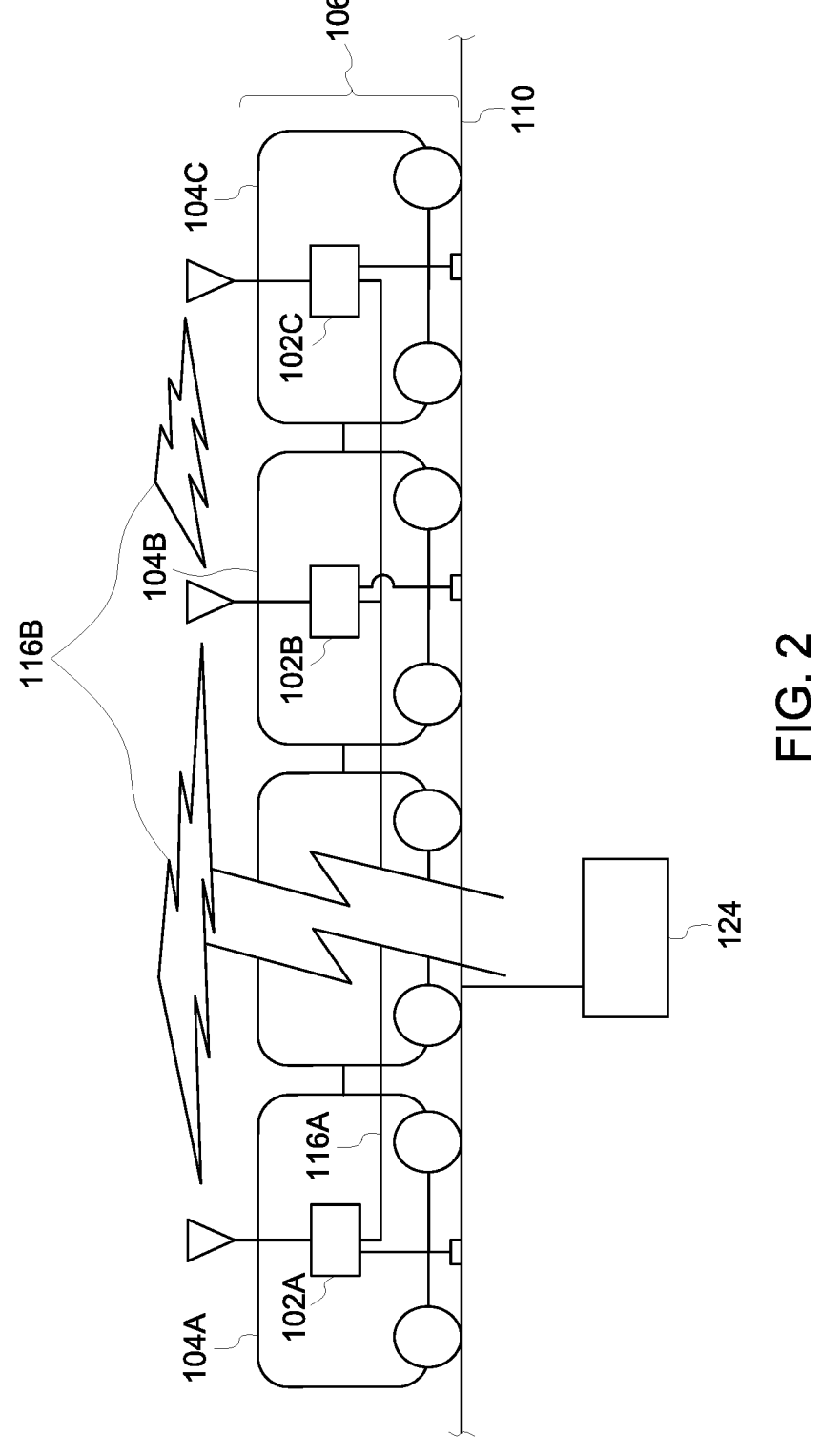
FIG. 2 illustrates one example of additional communication devices joining first and second communication paths shown in FIG. 1.

FIG. 2 illustrates one example of additional communication devices joining the first and second communication paths shown in FIG. 1. In operation, an additional communication device (e.g., communication device 102C in FIG. 2) can connect with the first communication path. This can occur during the process of adding another vehicle (e.g., vehicle 104C in FIG. 2) to the vehicle system. The communication device 102C can be connected with the first communication path as the vehicle 104C is added to the vehicle system. The communication device 102C can send a request signal along the first communication path after the communication device 102C is connected to the first communication path. Another communication device (e.g., the communication device 102A and/or 102B) having the security credential can then send the security credential to the newly joined communication device 102C. The newly joined communication device can then join or establish the second communication path and communicate with the other communication devices via the second communication path using the security credential that was shared.

Optionally, the communication device(s) can send a new, updated, or modified security credential to the newly joined communication device. This or these communication device (s) also can send this same new, updated, or modified security credential to the other communication devices. For example, responsive to a new communication device connecting with the first communication path, the communication device 102B can send an updated security credential to the new communication device and to the communication device 102A that already was communicating with the communication device 102B via the second communication path. The communication devices 102A-C can then join or establish the second communication path using the new security credential.

The sharing of the security credential with the communication device that is added to a pre-existing network of communication devices communicating on the second communication path can occur automatically (e.g., without operator intervention). For example, the added communication device can be programmed to automatically send the request signal on the first communication path responsive to connecting with the first communication path. As another example, the communication device 102A and/or 102B can detect the added communication device connecting to the first communication path. The communication device 102A and/or 102B can then share the security credential with the added communication device responsive to detecting the connection.

In one example, the second communication path communicates data signals at faster rates, at greater bandwidths, and/or with reduced electromagnetic noise relative to data signals communicated in the first communication path. For example, the communication devices can communicate data between each other via the second communication path at more bits or bytes per second than the first communication path. As another example, the communication devices can communicate data between each other via the second communication path using a larger range of carrier range frequencies than are available using the first communication path (e.g., due to the greater bandwidth of the second communication path). As another example, the communication devices can communicate data between each other via the second communication path with a lower error rate than occurs while using the first communication path (e.g., due to the greater noise using the first communication path).

The communication system can utilize the improved communications over the second communication path relative to the first communication path for a variety of different purposes, as described herein. For example, sensor data can be communicated via the second communication path; control signals can be communicated via the second communication path to allow one vehicle to control throttle settings, brake settings, or the like, of another vehicle; or the like.

Figure 3:
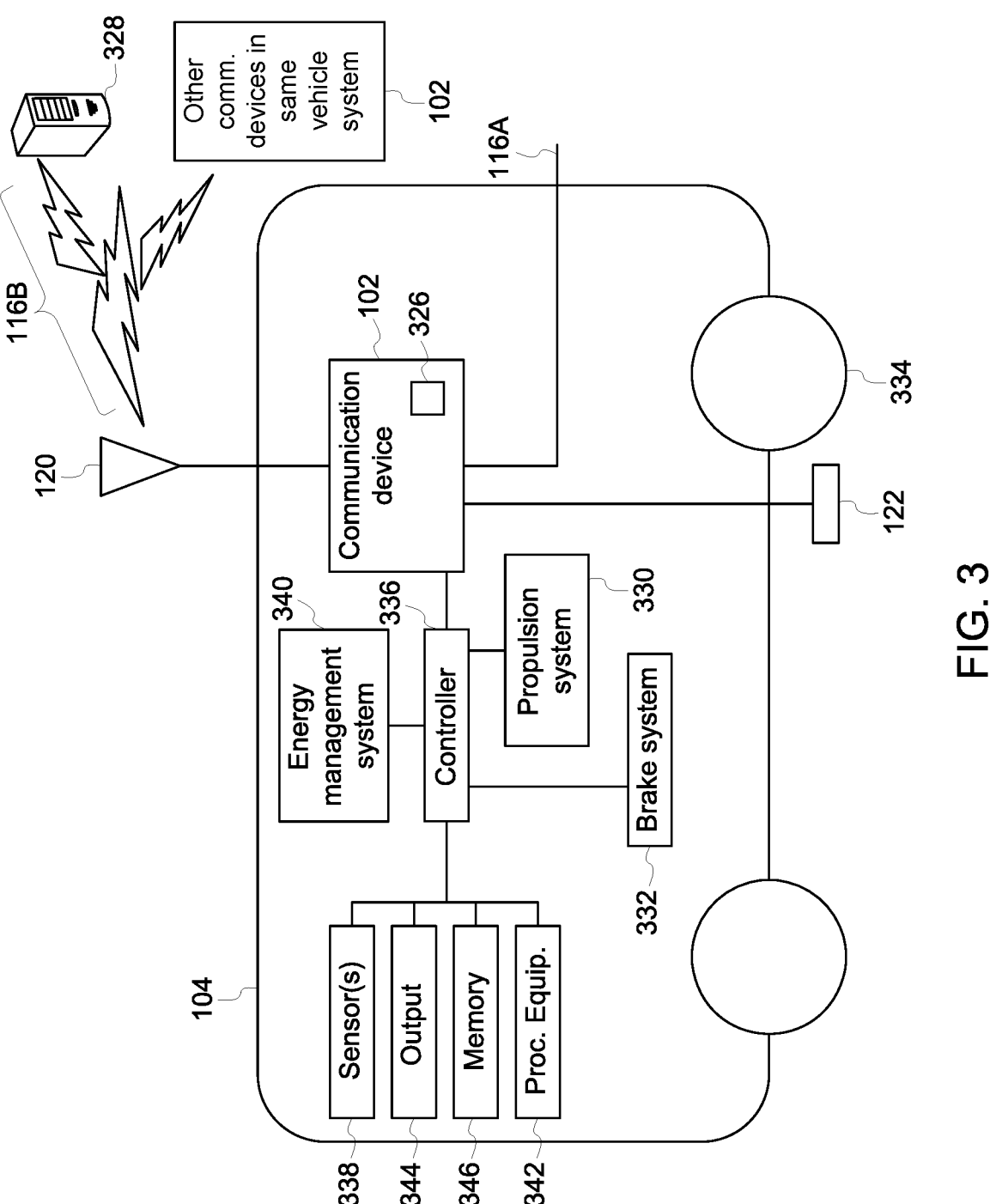
FIG. 3 illustrates one example of a vehicle shown in FIG. 1.

FIG. 3 illustrates one example of one of the vehicles 104 shown in FIG. 1. The vehicle includes the communication device that operates based on one or more software applications 326. These software application(s) 326 can translate data received from other equipment into data signals and/or send these data signals via the communication paths to one or more other pieces of equipment and/or communication devices. The software application(s) may require updates or modifications to the machine code forming the software application(s) 326 For example, the communication device can receive a notification signal from one or more off-board devices 328 (e.g., servers, data storage facilities, or the like, that also may have security credentials for communicating via the second communication path).

This notification signal may direct a download of a new software application 326, an update to an existing software application 326 already installed in memory of the communication device, and/or another change to the software application 326. The memory of the communication device also can be represented by 326 in FIG. 3. The communication device may download the new software application, update to the software application, or other change to the software application over or through the second communication path responsive to receiving this notification signal. Optionally, the communication device may periodically send a query signal via the second communication path to the off-board device to determine whether a new, updated, or changed software application is available and to download the new, updated, or changed software application.

The new software application, update to the software application, and/or other change to the software application can be downloaded by the communication device via the second communication path. The data downloaded for the new, updated, and/or changed software application can be downloaded at a much faster rate (e.g., in terms of bits or bytes per second) from the off-board device 328 via the second communication path than the first communication path. Optionally, the data downloaded for the new, updated, and/or changed software application can be downloaded at a much faster rate (e.g., in terms of bits or bytes per second) from the off-board device via the second communication path than another less secure wireless communication path. For example, another wireless communication path may have many other devices using that path for communication (including devices that do not have the security credential used to access or establish the second communication path). This can significantly reduce the rate at which data can be downloaded by the communication device relative to downloading the data via the second communication path.

Additionally, the second communication path can allow for multiple communication devices that are connected to and/or otherwise have access to the second communication path to download the data for the new, updated, and/or changed software application faster than if these communication devices obtained this data via another communication path. For example, the communication devices may not be able to download this data as quickly via the first communication path and/or via a less secure wireless communication path. This can permit the communication devices onboard the same vehicle system to download the data for the new, updated, and/or changed software application much faster than these communication devices currently are able to. Optionally, the second communication path can permit multiple or all communication devices onboard the same vehicle system to securely and simultaneously download the data for the new, updated, and/or changed software application.

Currently, some known vehicle systems are restricted to having the communication devices onboard the vehicle system individually download this data via the slower first communication path. Having the communication devices simultaneously or concurrently download the data for the new, updated, and/or changed software application can speed up the installation of this data on the different vehicles and can permit the vehicle system to return to operations not involving the installation of this data more quickly.

The vehicle also includes a propulsion system 330 and a brake system 332. The propulsion system can include equipment that operates to generate tractive effort to propel the vehicle. For example, the propulsion system can include one or more engines, alternators, generators, batteries, or other energy storage devices (e.g., capacitors, flywheels, etc.), and/or motors that operate to rotate wheels 334 of the vehicle. The brake system can include equipment that operates to generate braking effort to slow or stop movement of the vehicle. For example, the brake system can include one or more friction brakes, regenerative brakes (e.g., motors), or the like, that slow or stop rotation of the wheels. Optionally, the brake system may be part of the propulsion system. The motor(s) that propel the vehicle for the propulsion system also can use regenerative braking to slow or stop movement of the vehicle.

A controller 336 of the vehicle controls operation of the propulsion system and/or the brake system to control movement of the vehicle. The controller represents hardware circuitry that includes and/or is connected with one or more processors that perform the operations of the controller. The controller can receive input from an operator of the vehicle (e.g., manual actuation of a throttle, pedal, lever, button, touchscreen, or the like) and can change the tractive effort and/or braking effort created by the propulsion system and/or brake system to implement the operator-directed change in movement of the vehicle. The controller optionally can receive control signals via the communication device from another vehicle in the same vehicle system and/or from other equipment (onboard or off-board the vehicle system). These control signals may direct the controller to change operation of the vehicle. For example, a controller onboard another vehicle in the same vehicle system, an operator onboard another vehicle in the same vehicle system, an energy management system (described below) onboard another vehicle in the same vehicle system, the off-board device, or the like, can communicate control signals to the controller via the second communication path and the communication devices. The controller that receives the control signals can implement changes to the movement of the vehicle according to directions contained in the control signals.

In one example, each controller onboard the vehicle system can individually determine operational settings of the vehicle on which the controller is disposed and implement changes to the movement of the vehicle according to the determine operational settings. Currently, some known vehicle systems have a main controller onboard one propulsion-generating vehicle that determines and changes the operational settings for other propulsion-generating vehicles based on trip information. This main controller receives relevant trip information from sensors, operators, off-board devices, or the like, to determine how to change the operational settings of the propulsion-generating vehicles the vehicle system. The trip information can include warning about objects blocking the route, changes in upcoming speed limits, upcoming curves in the route, upcoming changes in grades in the route, etc.

Because the existing wired connections on these vehicle systems may be too slow for sharing this trip information with the controllers onboard the other vehicles to allow the controllers to individually determine how to change the operational settings of the corresponding vehicles, only the main controller determines the changes to operational settings for all vehicles in the vehicle system. Otherwise, the delay in sharing the same trip information could result in different controllers receiving the trip information at different times. This can result in one or more controllers receiving the trip information too late (e.g., after the conditions represented by the trip information have changed). Consequently, only one main controller is responsible for obtaining the trip information and determining the operational settings for all vehicles in the vehicle system.

Sensors 338 onboard different vehicles can sense trip information, off-board devices can provide trip information, and the like, and can share the trip information with multiple or all controllers via the second communication path. The sensors can represent cameras, radar systems, antennas, radio frequency identification tag readers, location sensors (e.g., global positioning system receivers), accelerometers, or the like, which determine trip information about the vehicles. The faster communication rates and/or greater bandwidth of the second communication path can permit this trip information to be shared with the controllers much more quickly than the first communication path. This can allow for the controllers to receive and examine the trip information, and individually determine changes to operational settings of the corresponding vehicle. The controllers may not need to only obey commands provided by the master controller but can individually and separately determine the operational settings for the corresponding vehicles. For example, if the trip information indicates that an object is on the route ahead of the vehicle system, this information can be shared with the controllers via the second communication path and the communication devices, and the controllers can individually determine whether to engage the brake system or reduce a throttle setting of the propulsion system. This determination may differ based on where the corresponding vehicle is located in the vehicle system to ensure the forces exerted on the couplers does not exceed predefined safety limits. Allowing the controllers to individually determine the operational settings of the corresponding vehicle makes the controllers less reliant or not reliant on a single controller to provide the operational settings.

In one example, the sensor data can be used to verify or confirm that a security credential is sent from or originates from a communication device onboard the same vehicle system as the communication device that receives the security credential via the first communication path. A first communication device that receives the security credential also can receive sensor data from one or more of the sensors, examine the sensor data to determine whether the security credential is sent from a second communication device onboard a vehicle in the same vehicle system as the first communication device, use the security credential to establish or join the second communication pathway responsive to determining that the second communication device is in the same vehicle system as the first communication device, or not use the security credential to establish or join the second communication pathway responsive to determining that the second communication device is not in the same vehicle system as the first communication device. For example, the first communication device can receive a heading of the vehicle in which the second communication device is disposed as the sensor data, compare this heading to the heading of the vehicle in which the first communication device is disposed, use the security credential to establish or join the second communication pathway responsive to determining that the headings are the same or similar to each other (e.g., within a designated angle of each other), or not use the security credential to establish or join the second communication pathway responsive to determining that the headings are not the same or are not similar to each other. As another example, the first communication device can receive a moving speed of the vehicle in which the second communication device is disposed as the sensor data, compare this speed to the moving speed of the vehicle in which the first communication device is disposed, use the security credential to establish or join the second communication pathway responsive to determining that the speeds are the same or similar to each other (e.g., within a designated range of each other), or not use the security credential to establish or join the second communication pathway responsive to determining that the speeds are not the same or are not similar to each other. In another example, the first communication device can receive a geographic location of the vehicle in which the second communication device is disposed as the sensor data, compare this geographic location to the geographic location of the vehicle in which the first communication device is disposed, use the security credential to establish or join the second communication pathway responsive to determining that the locations are within a designated distance of each other (e.g., the length of the vehicle system), or not use the security credential to establish or join the second communication pathway responsive to determining that the locations are not within the designated distance of each other.

Optionally, the controller can communicate with an energy management system 340 that determines the operational settings for the vehicles in the vehicle system. The energy management system represents hardware circuitry that includes and/or is connected with one or more processors. One or more of the processors of the communication device, the 336, and/or the energy management system may be the same processor. The energy management system examines trip data and/or trip information to create a trip plan. The trip data can include designated characteristics of an upcoming trip of the vehicle system that are not obtained from the sensors, such as a distance of the trip, grades in the route, curves in the route, speed limits of the route, weight of cargo being carried by various vehicles in the vehicle system, the number and/or arrangement of the vehicles in the vehicle system, a schedule by which the trip is to be completed, planned occupancies of the route by other vehicles or vehicle systems, etc. The trip information can be data obtained by the sensors.

The energy management system determines planned operational settings of the vehicle system at different locations, distances along the route, and/or times of the upcoming trip. These operational settings can be referred to as a trip plan. For example, the energy management system can designate or dictate throttle settings, brake settings, speeds, or the like, of the vehicle system as a function of one or more of time, location, and/or distance along the route. These settings can be determined by the energy management system to achieve one or more goals, such as to reduce the amount of fuel or energy consumed by the vehicle system during the trip (while arriving within a designated scheduled time at one or more locations), reducing emissions generated by the vehicle system (while arriving within a designated scheduled time at one or more locations), reducing forces exerted on the couplers and/or vehicles (while arriving within a designated scheduled time at one or more locations), or the like, relative to the vehicle system traveling according to other operational settings, such as the operational settings that cause the vehicle system to travel at the speed limits(s) of the route.

The energy management system can update or otherwise modify the trip plan during travel of the vehicle system. For example, the trip plan may be adjusted due to equipment failure of one or more vehicles, due to an unexpected problem with the route, due to a change in the trip schedule, or the like. The energy management system can obtain data from the sensors onboard other vehicles in the vehicle system and updated the trip plan based on this data. Because the sensor data can be communicated to the energy management system and/or the energy management system can communicate the trip plan and changes to the trip plan to the controllers via the speed second communication path, the energy management system can receive the sensor data, send the trip plan, and/or send updates to the trip plan at faster speeds than would be available using the first communication path. This may permit the trip plan to be updated and sent to the controllers on a more frequent basis due to the faster communication speeds of the second communication path.

As described above, one or more of the sensors may include a camera that generates video data and/or image data indicative of events occurring within a field of view of the camera. The higher speed second communication path can be used to transfer this camera data to equipment (e.g., controllers, energy management systems, other processing equipment, etc.) onboard vehicles other than the vehicle having the camera. The limited bandwidths and/or the limited data transfer rates of the first communication path may be insufficient to transfer the camera data and/or to transfer the camera data within an operationally reasonable time period. The operationally reasonable time period can be a time in which the sensor data is still useful for operation of the vehicle system. With respect to cameras, the operationally reasonable time period may be the time period between the time at which an object appears in the data output by a camera and the time at which a controller must act to avoid colliding with the object and/or the time at which the object no longer appears in the data output by the camera. The second communication path, however, may be able to communicate the camera data to the equipment onboard other vehicles within the operationally reasonable time period so that this equipment can examine and/or act on the camera data before the camera data is no longer relevant.

The sensor data can be communicated via the second communication path to equipment onboard another vehicle for display on an output device 344 (e.g., an electronic display), for storage in a tangible and non-transitory computer readable memory 346 (e.g., a computer hard drive, removable drive, or the like), and/or for examination and use by processing equipment 342. The processing equipment can represent one or more different computerized processing systems that examine the sensor data to perform one or more actions and/or to complete one or more analyses on the data to assist in controlling and/or monitoring operation of the vehicle and/or vehicle system.

In one example, the second communication path can be used by the vehicle system to assist a vehicle with performing an operation of the vehicle after processing equipment on the vehicle fails. For example, the processing equipment onboard the vehicle 104A may rely on location data obtained from a global positioning system receiver as the sensor onboard the vehicle 104A. Responsive to the processing equipment onboard the vehicle 104A failing or otherwise being unable to use the sensor data to perform one or more operations, the communication device 102B onboard another vehicle 104B may send the same type of sensor data (e.g., location data) from a similar sensor (e.g., another global positioning system receiver) that is onboard another vehicle 104B to the processing equipment onboard the vehicle 104A. This sensor data can be rapidly communicated to the processing equipment onboard the vehicle 104A via the second communication path. Because the second communication path is able to quickly send the sensor data, the loss of fidelity or degree of match in the sensor data from the sensor onboard the vehicle 104B would be reduced (relative to communicating this sensor data via the first communication path). For example, the sensor data may be able to be communicated from the vehicle 104B to the processing equipment on the vehicle 104A via the second communication path so quickly that the sensor data may appear to be from or may be as precise as the sensor data from the sensor onboard the vehicle 104A. The processing equipment on the vehicle 104A can then perform the operation(s) using the sensor data as if the operations were performed using sensor data from the sensor onboard the same vehicle 104A.

As another example, the processing equipment can include or represent another communication device, such as a radio used to communication with off-board devices 124. In one example, the processing equipment includes a 220 MHz radio (or other wireless communication device) used to communicate with off-board safety systems, such as a positive train control system. The radio can receive wireless signals from the off-board device that warns the vehicle system of obstructions of the route, slow orders, maintenance of the route, speed limits, requirements to engage brakes, etc. The radio can send this information to the controller, which can automatically control movement of the vehicle to abide by the instructions received from the off-board device.

In one example, the radio onboard one vehicle may fail or otherwise be unable to communicate with the off-board device. The communication system can switch to using a radio onboard another vehicle to receive the wireless signals from the off-board device. These signals can be communicated to the controller onboard the vehicle having the failed radio via the second communication path to prevent the failed radio on the vehicle from interfering with or preventing safe operation of the vehicle system.

Figure 4:
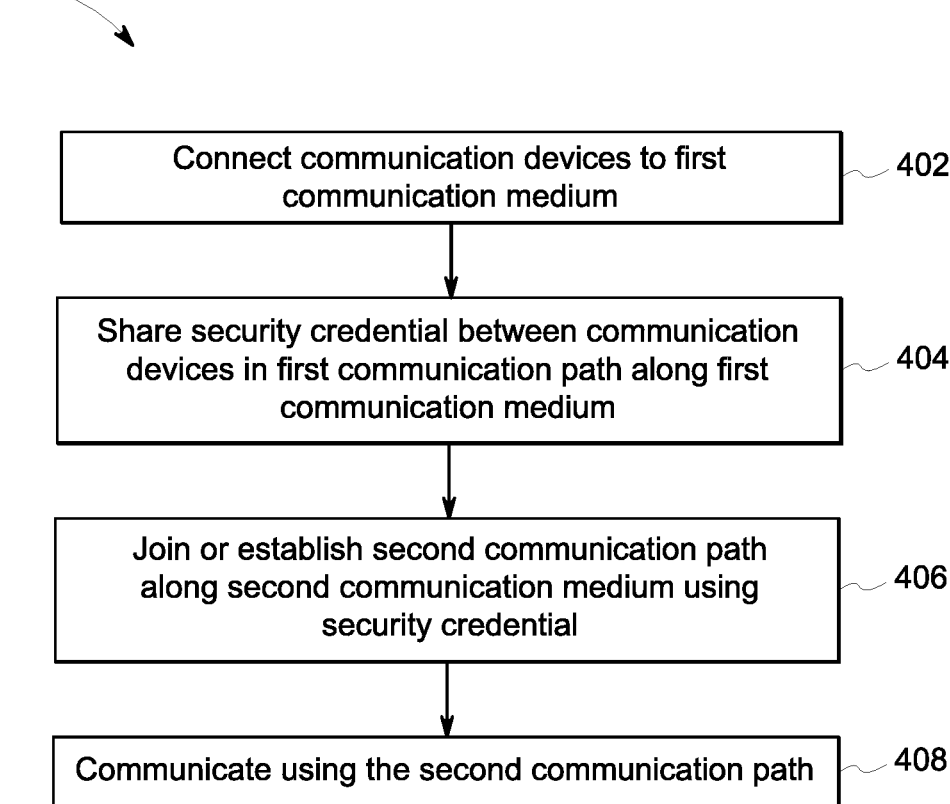
FIG. 4 illustrates a flowchart of one example for a method of establishing a secure communication system for a locomotive-based vehicle system.

FIG. 4 illustrates a flowchart of one example for a method 400 of establishing a secure communication system for a locomotive-based vehicle system. The method can describe the operations performed by the communication devices disposed onboard locomotives of a rail vehicle system. Alternatively, the method can describe the operations performed by communication devices disposed onboard another type of vehicle. At step 402, communication devices are connected with a first communication medium. The communication devices can be connected with a wired connection extending along the length of the vehicle system, such as a cable extending between the locomotives on which the communication devices are disposed. This first communication medium can be used as a first communication path between the communication devices. As described herein, this communication path may have slow data transfer speeds, limited bandwidth, and/or be more susceptible to electromagnetic noise.

At step 404, the communication devices can share a security credential with each other via the first communication medium. For example, one communication device can send the security credential to another communication device through the cable extending between the communication devices. At step 406, this security credential is used to join or establish a second communication path in a second communication medium. For example, the communication devices can create or join a wireless communication network using the security credential that is shared over the first communication medium. This second communication path may have faster data transfer rates, larger communication bandwidth, and/or less noise than the first communication path.

At step 408, the communication devices communicate with each other using the second communication path. The communication devices can communicate with each other to share sensor data, to individually control vehicles in the vehicle system, to allow equipment on one vehicle serve as a remote replacement for failed equipment on another vehicle, and the like.

In an example, a communication system (e.g., a train or locomotive communication system, or a communication system for another vehicle system, such as an on-road platoon of semi-trailer trucks) may include a first communication device located onboard a first vehicle in a vehicle system formed from the first vehicle and at least a second vehicle in the vehicle system. The system also may include a second communication device located onboard the second vehicle in the vehicle system. Initially, the first and second vehicles come together for electro-mechanical coupling (e.g., by an electrical cable), such that the first and second communication devices are communicatively coupled with each other via a wired connection extending between the first and second communication devices. When so connected, the first and second communication devices may share a security credential via the wired connection. The first and second communication devices also may establish a secure wireless network between the first and second communication devices using the security credential that is shared via the wired connection. The wireless network may be established before the wired connection is disconnected, or the wireless network may be established after the wired connection is disconnected, but in either case, the wireless network continues operation after the first vehicle and the second vehicle are mechanically disconnected from one another. The wireless network may be used by the vehicles to communicate control commands for one of the vehicles to control the other vehicle for coordinated movement along a route, without there being a mechanical connection between the vehicles. The secure wireless network may be similarly established between additional vehicles, e.g., one vehicle is sequentially connected to plural other vehicles via a wired connection, or the plural vehicles are interconnected to one another (e.g., in series) via a wired connection which is disconnected before the vehicles commence coordinated travel along a route.

In an example, a communication system (e.g., for a locomotive or train, or for other vehicles) includes a first communication device that may be located onboard a first vehicle in a vehicle system formed from the first vehicle and at least a second vehicle. The first communication device may communicate, using a first communication medium over a first communication path extending between the first communication device and a second communication device located onboard the second vehicle in the vehicle system, with the second communication device. The first communication device may share a security credential via the first communication path with the second communication device. The first communication device also may establish a secure second communication path between the first and second communication devices using the security credential that is shared via the first communication path. The second communication path is established by the first communication device using a different, second communication medium extending between the first and second communication devices.

In one example, a locomotive communication system includes a first communication device located onboard a first locomotive in a rail vehicle system formed from the first locomotive and at least a second vehicle in the rail vehicle system and a second communication device located onboard the second vehicle in the rail vehicle system, the first and second communication devices communicatively coupled with each other via a wired connection extending between the first and second communication devices. The first and second communication devices may share a security credential via the wired connection. The first and second communication devices also may establish a secure wireless network between the first and second communication devices using the security credential that is shared via the wired connection.

The first and second communication devices may securely communicate a data signal between the first and second communication devices via the secure wireless network to control operation of the vehicle system. The wired connection may include a multiple unit cable. The wired connection may include a portion of a conductive portion of a track on which the rail vehicle system is positioned. The first and second communication devices may establish the secure wireless network without the first or second communication device broadcasting identifying information about the first or second communication device or about the wireless network.

At least one of the first or second communication devices may communicate one or more of the security credential or an updated security credential to the one or more additional communication devices via the wired connection to connect the one or more additional communication devices to the secure wireless network using the one or more of the security credential or the updated security credential responsive to one or more additional rail vehicles having an additional communication device connecting with the rail vehicle system and with the wired connection.

In one example, a communication system includes a first communication device located onboard a first vehicle in a vehicle system formed from the first vehicle and at least a second vehicle, a second communication device located onboard the second vehicle in the vehicle system, and a first communication path extending between the first and second communication devices and established using a first communication medium. The first and second communication devices may share a security credential via the first communication path. The first and second communication devices also may establish a secure second communication path between the first and second communication devices using the security credential that is shared via the first communication path. The second communication path established by the first and second communication devices uses a different, second communication medium extending between the first and second communication devices.

The first and second communication devices may securely communicate a data signal between the first and second communication devices via the secure second communication path to control operation of the vehicle system. The security credential that is communicated via the first communication path may be an encryption key. The first communication medium may be a conductive connection between the first and second communication devices.

The first communication path may extend through and include an off-board communication device. The second communication medium used to establish the second communication path may be a wireless network. The first and second communication devices may establish the secure second communication path without the first or second communication device broadcasting identifying information about the first or second communication device.

The first and second communication devices may establish the secure second communication path without the first or second communication devices wirelessly broadcasting (a) a network identifier of any of the first or second communication devices or (b) a network identifier of a wireless network that connects the first and second communication devices. The second communication path may communicate data at one or more of faster data speeds or over larger data bandwidths than the first communication path.

In one example, a method includes communicating a security credential between communication devices onboard different vehicles in a vehicle system. The security credential is communicated between the communication devices via a first communication path established using a first communication medium extending between the communication devices. The vehicle system is formed from at least the vehicles having the communication devices that share the security credential. The method also includes establishing a secure second communication path between the communication devices onboard the different vehicles using the security credential that is shared via the first communication path, the second communication path established using a different, second communication medium extending between the communication devices and securely communicating a data signal between the communication devices via the secure second communication path to control operation of the vehicle system.

The method also may include concurrently updating one or more of stored data or software operating on the communication devices using a data update communicated to the communication devices via the second communication path. The method also may include receiving trip data at the communication devices via the second communication path. The trip data can indicate information on an upcoming trip or segment of a current trip of the vehicle system. The method also can include separately and individually determining operational settings of the vehicle systems based on the trip data. The operational settings can be determined separately and individually by a controller onboard each of the vehicles. The method also can include implementing the operational settings that are separately and individually determined by the controllers onboard the vehicles to change movement of the vehicle system.

The method also may include obtaining visual data from one or more cameras onboard a first vehicle of the vehicles in the vehicle system and communicating the visual data from the one or more cameras onboard the first vehicle to one or more of a display device or a tangible and non-transitory computer-readable memory located onboard a different, second vehicle of the vehicles in the vehicle system via the second communication path. The method also may include detecting a failure of first equipment that is located onboard a first vehicle of the vehicles in the vehicle system and that performs a function for operation of the first vehicle, identifying second equipment located onboard a different, second vehicle of the vehicles in the vehicle system that performs the same function as the first equipment responsive to detecting the failure of the first equipment, and communicating data between the first vehicle and the second equipment located onboard the second vehicle for performing the function for operation of the first vehicle.

In one example, a vehicle communication system is provided that includes a first communication device located onboard a first vehicle in a vehicle system formed from the first vehicle and at least a second vehicle in the vehicle system. The communication system also includes a second communication device located onboard the second vehicle in the vehicle system. The first and second communication devices are communicatively coupled with each other via a wired pathway extending between the first and second communication devices. The first communication device may receive a security credential from an off-board device via the wired pathway and share the security credential with the second communication device via the wired pathway. The first and second communication devices also may establish a wireless network between the first and second communication devices using the security credential that is shared via the wired pathway.

The first and second communication devices may securely communicate a data signal between the first and second communication devices via the wireless network to control operation of the vehicle system. The wired pathway may include a multiple unit cable (e.g., where the vehicle system is a rail vehicle system), a trainline (e.g., where the vehicle system is a rail vehicle system), a cable (e.g., where the vehicle system is a rail vehicle system or a vehicle system formed of vehicles other than rail vehicles), or a wire (e.g., where the vehicle system is a rail vehicle system or a vehicle system formed of vehicles other than rail vehicles). The wired pathway may include a portion of a conductive portion of a track on which the vehicle system is positioned or a catenary (e.g., where the vehicle system is a rail vehicle system).

The first and second communication devices may receive the security credential from the off-board device while the vehicle system is moving. The first and second communication devices may receive the security credential and establish the wireless network while the first and second vehicles are mechanically coupled with each other directly or indirectly. The first and second communication devices may communicate with each other via the wireless network that is established using the security credential after the first and second vehicles are decoupled from each other.

The security credential may be a first security credential and the first communication device may receive one or more additional security credentials with each of the first security credential and the one or more additional security credentials associated with different geographic areas. The first and second communication devices may switch which of the first security credential or the one or more additional security credentials is used to establish or maintain the wireless network based on changing locations of the vehicle system.

The second communication device may receive sensor data from one or more sensors and use the sensor data to verify that the security credential shared with the second communication device from the first communication device is from the first communication device that is included within the vehicle system that also includes the second vehicle system. The sensor data may include one or more of a heading, a moving speed, or a location.

In one example, a vehicle communication method is provided. The method includes receiving a security credential at a first communication device from an off-board device. The first communication device may be located onboard a first vehicle in a vehicle system formed from the first vehicle and at least a second vehicle in the vehicle system. The security credential may be received via a wired pathway extending between the first and second communication devices. The method also includes communicating the security credential from the first communication device to the second communication device via the wired pathway, and establishing a wireless network between the first and second communication devices using the security credential that is shared via the wired pathway.

The method also can include communicating a data signal between the first and second communication devices via the wireless network to control operation of the vehicle system. The security credential may be received via a multiple unit cable, a trainline, a cable, or a wire as the wired pathway. The security credential may be received via a portion of a conductive portion of a track on which the vehicle system is positioned or a catenary as the wired pathway. The security credential may be received from the off-board device while the vehicle system is moving.

The security credential may be received and the wireless network may be established while the first and second vehicles are mechanically coupled with each other directly or indirectly. The method also can include communicating one or more wireless signals between the first and second communication devices via the wireless network that is established using the security credential after the first and second vehicles are decoupled from each other. The security credential may be a first security credential, and the method also can include receiving one or more additional security credentials with each of the first security credential and the one or more additional security credentials associated with different geographic areas, and switching which of the first security credential or the one or more additional security credentials is used to establish or maintain the wireless network based on changing locations of the vehicle system.

The method also may include receiving sensor data from one or more sensors, and using the sensor data to verify that the security credential communicated to the second communication device from the first communication device is from the first communication device that is included within the vehicle system that also includes the second vehicle system. The sensor data may include one or more of a heading, a moving speed, or a location.

In one example, a communication system is provided and includes a first communication device disposed onboard a vehicle system. The first communication device may receive a security credential from an off-board device via a first wired pathway. The communication system also includes a second communication device disposed onboard the vehicle system. The first communication device may communicate the security credential to the second communication device via the first wired pathway or a second wired pathway. The first communication device or the second communication device may establish a wireless network between the first communication device and the second communication device using the security credential. The first communication device may be onboard a first vehicle of the vehicle system and the second communication device may be disposed onboard a second vehicle of the vehicle system. The first communication device and the second communication device may continue communicating with each other via the wireless network subsequent to the first vehicle separating from the second vehicle.

As used herein, an element or step recited in the singular and proceeded with the word "a" or "an" does not exclude plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The above description is illustrative, and not restrictive. For example, the above-described examples (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § (f), unless and until such claim limitations expressly use the phrase "means for" followed by a statement of function void of further structure.

This written description uses examples to disclose several examples of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A communication system, comprising:
a first communication device located onboard a first vehicle in a vehicle system formed from the first vehicle and at least a second vehicle in the vehicle system; and
a second communication device located onboard the second vehicle in the vehicle system, the first communication device and the second communication device communicatively coupled with each other via a wired pathway extending through the first vehicle and the second vehicle in the vehicle system and between the first communication device and the second communication device,
wherein the first communication device is configured to receive a security credential via the wired pathway from an off-board device that plugs into a circuit connected with the wired pathway, the first communication device configured to share the security credential with the second communication device via the wired pathway,
wherein one or both the first communication device and the second communication device also are configured to establish a wireless network between the first communication device and the second communication device using the security credential that is shared via the wired pathway, and
wherein the first vehicle and the second vehicle are configured to selectively couple and de-couple from each other, and wherein the first communication device and the second communication device are configured to receive the security credential and establish the wireless network while the first vehicle and the second vehicle are mechanically coupled with each other directly or indirectly, and the first communication device and the second communication device are configured to communicate with each other via the wireless network that is established using the security credential after the first vehicle and the second vehicle are decoupled from each other.

2. The communication system of claim 1, wherein the first communication device and the second communication device are configured to securely communicate a data signal between the first communication device and the second communication device via the wireless network to control operation of the vehicle system.

3. The communication system of claim 1, wherein the wired pathway comprises a multiple unit cable, a trainline, a cable, or a wire.

4. The communication system of claim 1, wherein the security credential is a first security credential and the first communication device is configured to receive one or more additional security credentials with each of the first security credential and the one or more additional security credentials associated with different geographic areas, the first communication device and the second communication device configured to switch which of the first security credential or the one or more additional security credentials is used to establish or maintain the wireless network based on which of the different geographic areas that the vehicle system is located within.

5. The communication system of claim 1, wherein the second communication device is configured to receive sensor data from one or more sensors and use the sensor data to verify that the security credential shared with the second communication device from the first communication device is from the first communication device that is included within the vehicle system that also includes the second vehicle system.

6. The communication system of claim 5, wherein the sensor data includes one or more of a heading, a moving speed, or a location.

7. A vehicle communication method, comprising:

receiving a security credential at a first communication device from an off-board device that plugs into a circuit connected with a wired pathway that extends through at least a first vehicle and a second vehicle of a vehicle system, the first communication device located onboard the first vehicle;

communicating the security credential from the first communication device to a second communication device onboard the vehicle system via the wired pathway; and establishing a wireless network between the first communication device and the second communication device using the security credential that is shared via the wired pathway, wherein the first vehicle and the second vehicle are configured to selectively couple and decouple from each other, and wherein the security credential is received and the wireless network is established while the first vehicle and the second vehicle are mechanically coupled with each other directly or indirectly, and wherein the method further comprises:

communicating one or more wireless signals between the first communication device and the second communication device via the wireless network that is established using the security credential after the first vehicle and the second vehicle are decoupled from each other.

8. The vehicle communication method of claim 7, further comprising:

communicating a data signal between the first communication device and the second communication device via the wireless network to control operation of the vehicle system.

9. The vehicle communication method of claim 7, wherein the security credential is received via a multiple unit cable, a trainline, a cable, or a wire as the wired pathway.

10. The vehicle communication method of claim 7, wherein the security credential is a first security credential and further comprising:

receiving one or more additional security credentials with each of the first security credential and the one or more additional security credentials associated with different geographic areas; and switching which of the first security credential or the one or more additional security credentials is used to establish or maintain the wireless network based on which of the different geographic areas that the vehicle system is located within.

11. The vehicle communication method of claim 7, further comprising:

receiving sensor data from one or more sensors; and using the sensor data to verify that the security credential communicated to the second communication device from the first communication device is from the first communication device that is included within the vehicle system that also includes the second vehicle system.

12. The vehicle communication method of claim 11, wherein the sensor data includes one or more of a heading, a moving speed, or a location.

13. A communication system, comprising:

a first communication device configured to be disposed onboard a vehicle system and connected with a first wired pathway that extends through at least one vehicle of the vehicle system, the first communication device configured to receive a security credential from an off-board device that plugs into a circuit connected with the first wired pathway; and a second communication device configured to be disposed onboard the vehicle system and connect with the first wired pathway, the first communication device also configured to communicate the security credential to the second communication device via the first wired pathway or a second wired pathway, the first communication device and the second communication device configured to establish a wireless network between the first communication device and the second communication device using the security credential, wherein the at least one vehicle of the vehicle system includes a first vehicle and a second vehicle configured to selectively couple and physically separate from the vehicle system, and wherein the first communication device is configured to be disposed onboard the first vehicle and the second communication device is configured to be disposed onboard the second vehicle, and the first communication device and the second communication device are configured to continue communicating with each other via the wireless network subsequent to the first vehicle separating from the second vehicle, the first communication device is configured to receive a second vehicle geographic location of the second vehicle, compare the second vehicle geographic location to a first vehicle geographic location of the first vehicle, determine whether the first vehicle geographic location and the second vehicle geographic location are within a designated distance of each other, and establish the wireless network with the second communication device using the security credential responsive to determining that the first vehicle geographic location and the second vehicle geographic location are within the designated distance of each other.

14. The communication system of claim 13, wherein the security credential is a first security credential and the first communication device is configured to receive one or more additional security credentials, the first communication device and the second communication device configured to switch which of the first security credential or the one or more additional security credentials is used to establish or maintain the wireless network based on changes to the first vehicle geographic location or the second vehicle geographic location.

\* \* \* \* \*